United States Patent Office 3,499,154
Patented Mar. 3, 1970

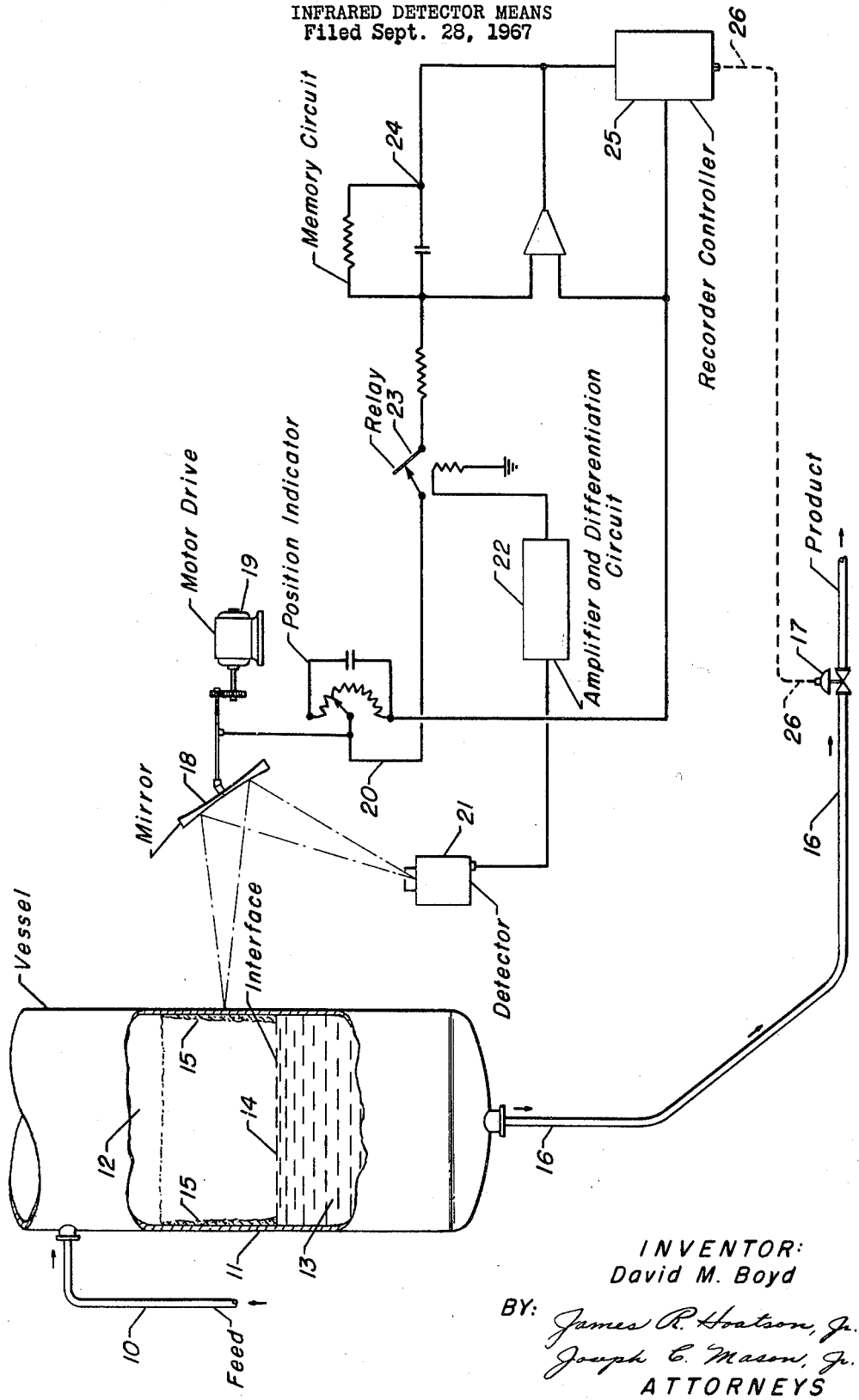

3,499,154
APPARATUS FOR LOCATING THE INTERFACE BETWEEN TWO SUPERIMPOSED FLUIDS WITHIN A VESSEL UTILIZING INFRARED DETECTOR MEANS
David M. Boyd, Clarendon Hills, Ill., assignor to Universal Oil Products Company, Des Plaines, Ill., a corporation of Delaware
Filed Sept. 28, 1967, Ser. No. 671,288
Int. Cl. G01t 1/00
U.S. Cl. 250—83.3                                8 Claims

ABSTRACT OF THE DISCLOSURE

Method and apparatus for determining the interface or level in a vessel holding at least two superimposed fluids using an infrared imaging technique. Specifically, the invention is applicable for the system having hot or boiling liquid as one fluid and vapor as the other fluid such as determining the liquid level in the bottom of a distillation column.

BACKGROUND OF THE INVENTION

This invention relates to a method and apparatus for locating the interface or plane of contact between two superimposed fluids within a vessel. The invention particularly relates to interface sensing apparatus utilizing an infrared imaging technique to determine, for example, a liquid level in the bottom of a distillation column.

There is a continuing need in the chemical process industries for locating and determining fluid levels in various types of enclosing vessels. Frequently, the prior art has utilized gage glasses, gamma-ray level gages, and the like, for monitoring vapor-liquid interfaces and other interfaces which can be either visually located or determined by varying a change in some physical property of the enclosed fluids, such as density. Except in relatively simple applications, the level gage or sight gage is not at all satisfactory for modern day chemical processing techniques. The requirements for quickly and accurately determining the location of an interface has lead the prior art devices to concentrate on various techniques for using gamma-ray gages. These gamma-ray gages, of course, utilize one or more sources of radioactivity positioned either in or around the vessel in such a manner that suitable detection devices can receive radiation intensity of varying degrees depending upon the type of fluid which such ray passes through. Even though these radioactive devices have proved more or less satisfactory for present day use, there is one outstanding disadvantage, and that is the potential danger in handling and using radioactive devices.

As those skilled in the art well know, the handling, use, storage, maintenance, etc., of radioactive materials requires extremely strict procedures in order to minimize the hazard to personnel. Accordingly, it would be desirable to have an interface sensing apparatus which does not require the use of radioactive materials and which does not require the use of visual means, such as a level gage or sight gage device.

SUMMARY OF THE INVENTION

Therefore, it is an object of this invention to provide a method and apparatus for determining the interface or level in a vessel holding at least two superimposed fluids.

It is another object of this invention to provide a method and apparatus for the accurate location of one or more interfaces within a closed vessel.

It is a specific object of this invention to provide a method and apparatus for determining the liquid level in, for example, the lower portion of a distillation column containing a boiling liquid having hot vapor superimposed thereabove.

Accordingly, the present invention provides an interface sensing apparatus for use and in combination with a closed vessel containing at least one interface between two superimposed phases in direct mutual contact comprising mirror means located exteriorly of said vessel and movably supported in a manner to obtain a traversed image of said vessel along a substantially vertical axis; temperature sensitive infrared detector means located exteriorly of said vessel and positioned to detect reflected infrared beams from said mirror means; drive means coupled to said mirror means for moving said mirror as specified hereinabove; and readout means coupled to said detector and to said drive means.

Another embodiment of this invention includes the apparatus hereinabove further characterized by control means connected to said drive means operative to cause said mirror means to periodically traverse at least a portion of the height of said vessel including the plane of contact between said phases and independently of the location of said plane of contact.

In its method embodiments the present invention provides a method of detecting the elevation of an interface between two superimposed fluids contained in a closed vessel which comprises scanning the surface of said vessel with mirror means in a substantially vertical plane extending above and below said interface; reflecting infrared beams from said mirror into temperature sensitive infrared detecting means and developing therefrom a first signal representing a change in temperature of said scanned surface; developing a second signal representing the position of said mirror means relative to said plane of scan; and developing a third signal from said first and second signals representing the elevation of said interface in said vessel.

Thus, it is seen from the above description that the present invention contains both method and apparatus aspects. The apparatus aspect embodies broadly the equipment for developing signals based on infrared imaging. The method aspects embody broadly the utilization of the generated signals to sense and/or locate an interface between two superimposed fluids.

Broadly, the present invention is applicable for the determination of an interface between two superimposed fluids. Specifically, the invention is applicable to the monitoring of vapor-liquid interfaces, gas-solid interfaces, liquid-liquid interfaces, etc. However, the present invention is distinctly and uniquely applicable to the determination of vapor-liquid interfaces and more specifically to the determination of such an interface which is relatively hot, i.e., a boiling liquid having vapor immediately above the boiling liquid surface.

In the latter application it is believed that the infrared imaging technique operates satisfactorily due to a difference in the rate at which heat is transferred through the wall of a vessel from the vapor space relative to the rate at which heat is transferred through the wall of the vessel in the liquid phase. For the boiling liquid application, the vapor space above has a tendency to condense on the inner surface of the enclosing vessel thereby providing a liquid film through which the heat must be transferred to the outside of the vessel. By using the infrared imaging technique of the present invention, the temperature change between the vapor phase and the liquid phase may be detected and the location of this temperature change is utilized as being representative of the interface between these two superimposed fluids.

As those skilled in the art know, the term "infrared imaging" is embodied broadly in the phrase "thermography." The technical principles upon which the behavior of invisible infrared rays is applicable is based upon the same laws, generally, as all other electromagnetic waves. It is textbook knowledge of the prior art that every object with a temperature higher than absolute zero emits energy at its surface. The wave length and intensity of the emitted energy is based upon a number of technical factors including the condition of the surface of the object, i.e., the emissivity of its surface, and of course, on the absolute temperature of the object. The Stefan-Boltzmann law describes the relationship between temperature and emissivity by empirically providing that the total radiation emitted by an object is proportional to the object's area and emissivity and to the fourth power of the object's absolute temperature. The present invention utilizes this principle of detecting extremely small temperature differences across the surface of a closed vessel utilizing the strength of infrared beams emitted from such surface.

The specific pieces of apparatus and circuitry which are utilized in infrared imaging are broadly known to those skilled in the art. Generally, a mirror is used to reflect infrared rays into a suitable temperature sensitive infrared detector which can be a thermistor composed of nickel, cobalt, and magnesium oxide in the form of a thin flake mounted on a sapphire. The thermistor changes its electrical resistance in proportion to the radiant energy received. The electrical signals from the detector are then amplified in suitable form, differentiated by suitable circuitry to detect the point at which the rate of change of temperature is at a maximum and the output of the differentiation circuit is utilized to activate appropriate relay means located in the position device which indicates the position of the mirror relative to the vessel. In order to locate the interface, a memory circuit is used to store the determined position of the mirror at only the point at which the rate of change of temperature is at a maximum. The output from the memory circuit is then fed through appropriate readout means, such as a strip chart recorder, to provide visual indication of the location of the sensed interface. If desired, the readout means can be an appropriate recorder-controller for actually controlling the level in the vessel, such as by controlling the amount of feed into and/or product withdrawn from the vessel thereby maintaining the liquid level at some predetermined location.

The invention may be more fully understood with reference to the attached drawing which provides a schematic representation of apparatus, equipment, and circuitry for practicing one embodiment of the present invention.

DESCRIPTION OF THE DRAWING

Referring now to the drawing, a suitable feed, such as a petroleum hydrocarbon, is introduced hot via line 10 into the lower portion of vessel 11 which may be a distillation column of conventional design. The feed material is separated into a fluid vapor 12 and a relatively hot or boiling liquid 13 having interface 14 therebetween. Since liquid 13 is boiling, a portion of vapor 12 condenses on the sides of the vessel forming liquid film 15. In one embodiment of the invention, product is withdrawn from vessel 11 via line 16 through control valve 17, the response of which is more fully discussed hereinbelow.

By way of illustration, the abovedescribed environment is suitably exposed to the infrared imaging technique of the present invention. Apparatus comprising mirror 18, motor drive and control means 19, mirror position indicator 20, infrared detector means 21, amplifier and differentiation circuit 22, relay 23, memory circuit 24, recorder-controller means 25 and lead means 26 for connecting recorder-controller 25 to control valve 17.

In operation, scanning mirror 18 placed at, say, 45 degrees to the optical axis is driven by motor drive and control means 19 coupled through appropriate cam and gear means to periodically provide a substantially vertical traverse covering, for example, 20 degrees including a point above and a point below interface 14. The scanning mirror in a preferred embodiment is continuously moved through this plane of scan in order to provide a traversed image of the exterior of the vessel for a substantially vertical section of vessel 11 including the expected plane of contact 14 within the vessel. As mirror 18 is moved by means 19, its position is constantly monitored by device 20 which may be potentiometric means.

The reflected infrared beams are intercepted by infrared beam detector 21. The signal from detector 21 is passed through amplifier means and differentiating circuit means 22 to produce a first signal representing a change in temperature of the scanned surface (deemed as the elevation at which the rate of change of temperature with elevation is maximum). This first signal activates relay 23 thereby completing the circuit for a second signal which represents the position of said mirror means relative to said plane of scan at the instant in time with which relay 23 is closed. Thus, a third signal responsive to the first and second temperature scan is fed into memory circuit 24 which is read out to recorder-controller 25 which is a conventional strip chart recorder suitably calibrated to indicate the level of fluid in vessel 11. As the mirror is rotated through its plane of scan, memory circuit 24 ultimately reflects any change in the elevation of interface 14 with respect to its position in vessel 11.

As previously mentioned, the apparatus may also be adapted to generate a signal suitable for automatic control of interface height through the use of other components well known to those skilled in the control system art. Thus, the readout signal from recorder-controller 25 may be passed through lead 26 to control valve 17 for the regulation of the amount of product withdrawn through line 16 in response to the elevation level determination of interface 14.

It is to be emphasized that the exact configuration of the circuitry and various components described is not critical to the practice of the present invention. Those skilled in the art may devise other means for developing appropriate signals utilizing infrared radiation imaging which could be used satisfactorily in the practice of this invention. In other words, any system of thermography which has demonstrated satisfactorily an ability to amplify and utilize reflected infrared beams can be used by those skilled in the art in the practice of this invention.

Another embodiment of the invention would include essentially the same components described hereinabove except that the detector is moved through an appropriate arc providing a traversed image of a substantially vertical section of the enclosing vessel. In this embodiment, therefore, with reference to the appended drawing, mirror 18 would be fixed, motor drive and control means 19 and position indicator 20 would be connected to detector 21. Also, in this embodiment, memory circuit 24 would be utilized to remember the position of detector 21 at that instant in time when the rate in change in temperature relative to elevation is at a maximum. These specific changes for this latter embodiment have not been shown since those skilled in the art from the teachings presented herein and from general knowledge will be able to develop the alternative apparatus for practicing the embodiment of this invention wherein the detector means is movable around fixed mirror means.

Still other embodiments of this invention may now be evident to those skilled in the art, such as a moving belt system for moving synchronously mirror means and detector means up and down the side of the enclosing vessel in fixed relationship to each other thereby determining, as previously discussed, the change in temperature at the interface between two superimposed fluids.

Although the invention is especially advantageous for locating vapor-liquid interfaces, other applications will suggest themselves to those skilled in the art. These include ordinary liquid level gages or transmitters where for one reason or another conventional instrumentation would prove unsatisfactory. The instant invention may be used to monitor the level of a fluidized catalyst bed in a reactor or in the regenerator of a fluid catalytic cracking unit. The present invention may also be used to locate liquid-liquid interfaces in a multistage countercurrent liquid-liquid extraction column or to determine the liquid level and/or froth height on each of a number of fractionating trays in a multistage fractionation column.

The invention claimed:

1. Interface sensing apparatus for use and in combination with a closed vessel containing at least one interface between two superimposed phases in direct mutual contact, the lower phase being a boiling liquid and the upper phase being a vapor condensing on the inner surface of said vessel, said apparatus comprising mirror means located exteriorly of said vessel and movably supported in a manner to obtain a traversed image of said vessel along a substantially vertical axis; temperature sensitive infrared detector means located exteriorly of said vessel and positioned to detect reflected infrared beams from said mirror means; drive means coupled to said mirror means for moving said mirror as specified hereinabove; and, readout means coupled to said detector and to said drive means.

2. Apparatus according to claim 1 further characterized by control means connected to said drive means operative to cause said mirror means to periodically traverse at least a portion of the height of said vessel including the plane of contact between said phases and independently of the location of said plane of contact.

3. Interface sensing apparatus for use and in combination with a closed vessel containing at least one interface between two superimposed phases in direct mutual contact, the lower phase being a boiling liquid and the upper phase being a vapor condensing on the inner surface of said vessel, said apparatus comprising mirror means located exteriorly of said vessel in a manner to image at least a portion of the exterior surface of said vessel; temperature sensitive infrared detector means located exteriorly of said vessel and movably supported in a manner to obtain reflected infrared beams from said mirror representing a traversed image of said vessel; drive means coupled to said detector means for moving said detector as specified hereinabove; and, readout means coupled to said detector.

4. Apparatus according to claim 3 further characterized by control means connected to said drive means operative to cause said detector means to periodically traverse at least a portion of the angle of reflectance of said mirror means including that portion of the image containing the plane of contact between said phases.

5. In a vessel containing at least two superimposed fluids having an interface therebetween, the lower fluid being a boiling liquid and the upper fluid being a vapor condensing on the inner surface of said vessel, the method of detecting the elevation of said interface which comprises scanning the surface of said vessel with mirror means in a substantially vertical plane extending above and below said interface; reflecting infrared beams from said mirror into temperature sensitive infrared detecting means and developing therefrom a first signal representing a change in temperature of said scanned surface; developing a second signal representing the position of said mirror means relative to said plane of scan; and, developing a third signal from siad first and second signals representing the elevation of said interface in said vessel.

6. Method according to claim 5 wherein a portion of said liquid is withdrawn from said vessel at a rate responsive to said third signal.

7. In a vessel containing at least two superimposed fluids having an interface therebetween, the lower fluid being a boiling liquid and the upper fluid being a vapor condensing on the inner surface of said vessel, the method of detecting the elevation of said interface which comprises scanning at least a portion of the reflectance area of a mirror with an infrared detector in a manner sufficient to detect the infrared beams originating from said vessel over a plane extending from above to below said interface and reflected by said mirror, developing a first signal from said detector representing a channel in temperature of the scanned plane, developing a second signal representative of the position of said detector relative to the position of said mirror, and developing a third signal from said first and second signals representing the elevation of said interface in said vessel.

8. Method according to claim 7 wherein a portion of said liquid is withdrawn from said vessel at a rate responsive to said third signal.

References Cited

UNITED STATES PATENTS

| | | |
|---|---|---|
| 2,456,233 | 12/1948 | Wolf. |
| 2,895,049 | 7/1959 | Astheimer et al. |
| 3,209,149 | 9/1965 | Tucker. |
| 3,405,270 | 10/1968 | Briggs. |

ARCHIE R. BORCHELT, Primary Examiner